July 8, 1941.  E. NASSIMBENE  2,248,111

BELT SPLICING DEVICE

Filed Feb. 1, 1941  2 Sheets-Sheet 1

Inventor:
Ernest Nassimbene
By Martin E. Anderson
Attorney

July 8, 1941.          E. NASSIMBENE          2,248,111
BELT SPLICING DEVICE
Filed Feb. 1, 1941                 2 Sheets-Sheet 2
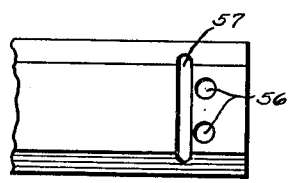
Fig. 10
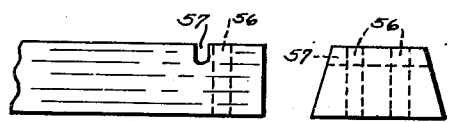
Fig. 11    Fig. 12
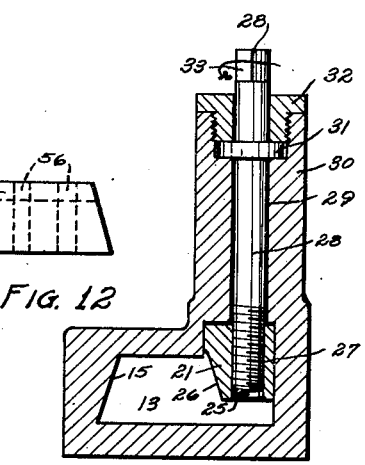
Fig. 6
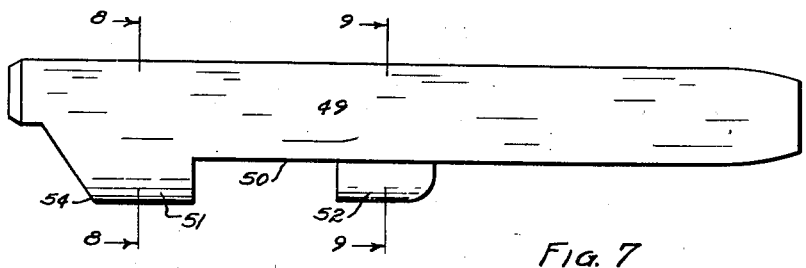
Fig. 7
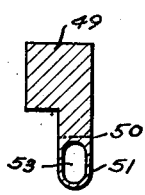   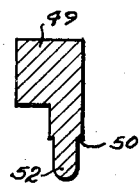
Fig. 8           Fig. 9
Inventor:
Ernest Nassimbene
By Martin E. Anderson
Attorney Patented July 8, 1941

2,248,111

UNITED STATES PATENT OFFICE 2,248,111

BELT SPLICING DEVICE

Ernest Nassimbene, Denver, Colo., assignor to The Gates Rubber Company, Denver, Colo., a corporation of Colorado Application February 1, 1941, Serial No. 376,955

6 Claims. (Cl. 164—13)

This invention relates to improvements in special tools and has reference more particularly to a tool or mechanism for use in splicing V-type belts.

In places where belt drives employing V-type belts are extensively used it frequently becomes necessary to splice such belts.

Since V-type belts differ so radically from the ordinary flat belts, they cannot be spliced in the same manner, but require special connectors that must be attached to the ends of the belts in a solid and substantial manner. Before such connectors can be applied to the belts, the ends of the latter must be provided with one or more holes for the reception of bolts or rivets and with a transversely extending groove in its inner surface. The holes and the groove must be accurately positioned relative to each other and to the ends of the belts.

It is the object of this invention to produce a special tool or device by means of which V-type belts can be prepared for splicing both quickly and accurately.

In order to explain this invention so that its construction and mode of operation can be readily understood, reference will now be had to the accompanying drawings in which the invention has been illustrated, and in which:

Figure 6 is a section taken on line 6—6, Figure 3;

Figure 7 is a side elevation of the grooving tool;

Figure 8 is a section taken on line 8—8, Figure 7;

Figure 9 is a section taken on line 9—9, Figure 7;

Figure 10 is a top plan view of a V-typed belt showing the same as it appears after it has been put in condition for splicing;

Figure 11 is a side elevation of the belt shown in Figure 10; and

Figure 12 is an end view thereof.

Figure 1:
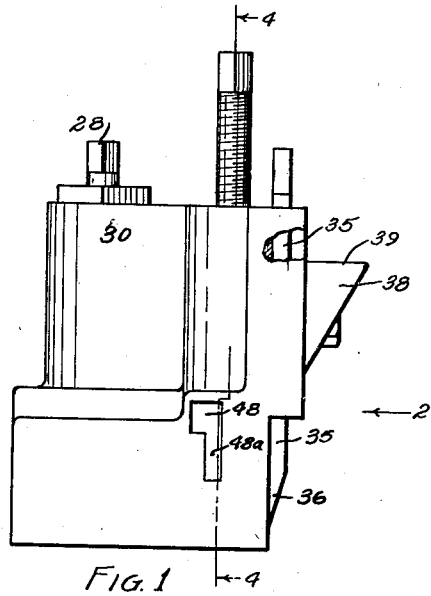
Figure 1 is a side elevation of the device looking in the direction of arrow 1, Figure 2.

In the drawings reference 12 designates a metal body which forms the principal part of the device or mechanism to which this invention relates.

Figure 2:
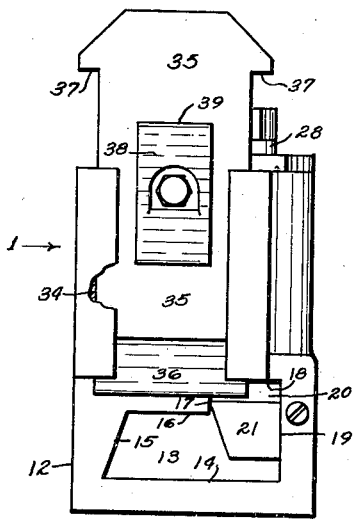
Figure 2 is a front elevation looking in the direction of arrow 2, Figure 1.
Figure 3:
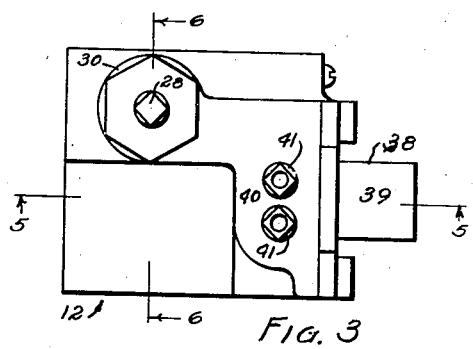
Figure 3 is a top plan view of the device.
Figure 4:
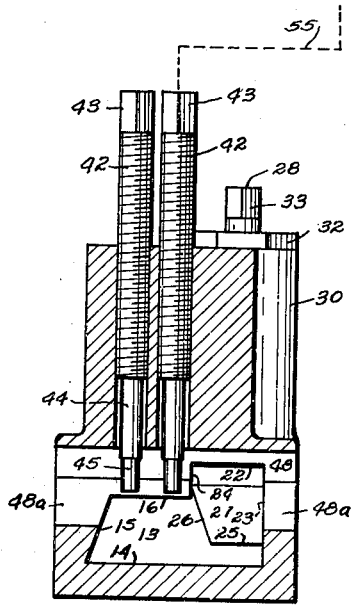
Figure 4 is a section taken on lines 4—4, Figures 1 and 3.

This body is provided with several openings, one of which has been designated by reference numeral 13 and this opening is bounded by a bottom wall 14 and an upwardly inclined end wall 15, and a top wall 16 that is parallel to the bottom 14 and which terminates in an upwardly extending wall 17, which terminates in a horizontal wall 18 that connects with the bottom 14 by means of a wall 19. The recess formed by walls 17, 18 and the upper end of wall 19, has been designated by reference numeral 20. Positioned in recess 20 is a clamping block 21 that has two right angularly related walls 22 and 23. Wall 22 terminates in a downwardly extending wall 24 which is joined to the bottom wall 25 by an inclined wall 26. Clamping block 21 is normally positioned as shown in Figures 2, 4 and 6 and is provided with a threaded opening 27 for the reception of the threaded end of a bolt 28 that is mounted for rotation in an opening 29 of an upwardly extending portion 30 of the metal body 12. Bolt 28 is provided with a collar 31 that is positioned in the enlarged upper end of opening 29. A flange nut 32 surrounds the upper end of the bolt and engages the upper surface of flange 31. The upper end of bolt 28 is made square for the reception of a tool by means of which it may be rotated. It will be observed from Figure 6 that when the bolt 28 is turned in the direction of arrow 33, the clamping block 21 will move downwardly. The function of block 21 is to clamp a V-type belt in opening 13 by urging it against the inclined wall 15. The front side of the metal body is provided with oppositely positioned guide grooves 34 for the reception of the opposite edges of a combined stop and shearing member 35. The lower end of the shearing member is inclined inwardly as indicated by reference numeral 36 and terminates in a shearing edge. The upper end of the shearing member is provided with outwardly extending shoulders 37 which engage the upper end of the metal body and serves to limit the downward movement of the shearing member. The outer surface of member 35 has formed integral therewith a triangular projection 38 whose upper surface 39 can be readily struck by a hammer for the purpose of driving the shearing member through a belt as will hereinafter be more fully explained. That part of the metal body which has been designated by reference numeral 40 is provided with two spaced threaded openings 41 for the reception of two tubular threaded punches 42. The upper ends of the punches are made square as designated by reference numerals 43 and the lower ends are turned down into smooth cylindrical portions 44 whose diameters are less than the root diameters of the threads. The extreme lower ends of the punches are still further reduced in diameter as indicated by reference numeral 45.

Figure 5:
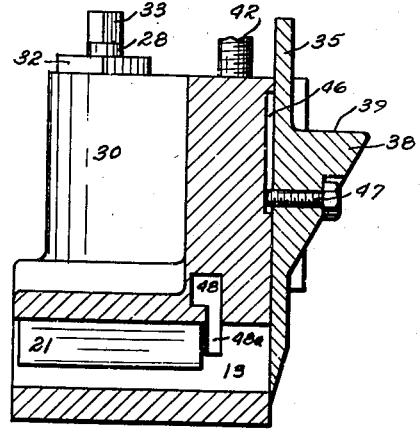
Figure 5 is a section taken on line 5—5, Figure 3.

The surface of the metal body between the guide grooves 34 is provided with an elongated recess 46 into which the end of bolt 47 extends when it is in the position shown in Figure 5. Bolt 47 serves as a limiting stop for the shearing member 35. The metal body is provided with a guide opening 48 that extends transversely of opening 13 and intersects the top and the upper ends of the side walls of the latter opening. The upper portion of opening 48 is wider than the lower end thereof which has for this reason been designated by reference numeral 48a. Guide opening 48, 48a is for the purpose of receiving and guiding a grooving tool which has been shown in side elevation in Figure 7 and which is designated by reference numeral 49. The growing tool comprises a steel bar having a general shape of opening 48, 48a, the upper rectangular portion thereof being slidably mounted in the correspondingly shaped upper end of the opening which has been designated by reference numeral 48. The line designated by reference numeral 50 in Figure 7 is positioned at the correspondingly numbered points in Figures 8 and 9. The under side of the grooving bar is provided with two downwardly extending projections, one of which has been designated by reference numeral 51 and the other by reference numeral 52. It will be observed that projection 51 is provided with an opening 53 and the front end of the walls surrounding the opening and which has been designated by reference 54 is sharpened. The projection 52 is solid and slightly smaller than projection 51.

Let us now assume that a belt having the shape shown in Figure 12 and of the proper size to fit the opening 13 is to be cut and spliced. The belt is inserted into opening 13 with its end projecting a short distance beyond the surface against which the shear member 35 slides. Bolt 28 is now rotated moving the block 21 downwardly until the belt is clamped against wall 15 and held securely in place. The shearing member 35 is now urged downwardly by means of blows from a hammer until it shears the belt making the sheared end thereof square and even. A suitable tool comprising a crank, which has been shown in dotted lines in Figure 4 and designated by reference numeral 55, is now applied to the upper end of one of the tubular punches 32 and the latter turned in a direction to move the punch downwardly, whereupon the punch will penetrate the belt, making an opening which has been designated by reference numeral 56. The other punch is now turned in the same manner, whereupon another opening spaced from and parallel to the first is cut in the belt. The grooving tool 49 is inserted from the right in Figure 4 and moved inwardly until the cutting edge 54 engages the belt, whereupon this tool is driven through by means of a hammer thereby cutting a groove of a size corresponding to the downward projection 51. After projection 51 has passed through the belt the second projection, which has been designated by reference numeral 52, is forced through the groove thus cut and serves to clean the same. The belt can now be removed and will have the appearance shown in Figures 10, 11 and 12, in which the groove has been designated by reference numeral 57. The belt is now removed, after which the other end thereof is similarly prepared for the coupling device.

If the belt has first been cut to the proper length by means of a tool making a perpendicular cut, it is merely inserted into the opening 13 until the cut end abuts the inner surface of the shearing member which serves as a stop and positions the ends in a predetermined relation to the punches and to the grooving tool.

It may be possible to punch the holes 56 or drill them with another machine, but if this is done the punches are still useful for the purpose of holding the belt positively in adjusted position until the grooving tool has been operated.

Although a specific clamping means has been illustrated, it is to be understood that other and equivalent means can be substituted for the ones shown which, although it has proved very successful in operation, is merely illustrative of means for this purpose.

It will be apparent from the above that by means of this device, V-type belts can be readily prepared for the reception of the splicing devices usually employed and that the openings 56 and groove 57 will be accurately spaced from each other and from the end of the belt.

If, as has been intimated above, the belt has been cut to the proper length, the shearing member 35 is left in the position shown in Figure 5 and serves as a stop for positively positioning the belt in the opening and this member therefore serves two independent functions and comprises both a means for shearing and a stop means.

Having described the invention what is claimed as new is:

1. A machine for use in splicing belts, comprising a metal block having an opening of the proper size and shape to receive a belt to be sliced, and an opening intersecting the belt receiving opening at right angles, a punch movably mounted in the second mentioned opening, the block having a guide opening in communication with and extending transversely of the belt receiving opening to guide a groove cutting tool and position it relative to the belt and to the punch.

2. A machine for use in splicing belts, comprising a metal block having an opening of the proper size and shape to receive a belt to be spliced, and a threaded opening intersecting the belt receiving opening at right angles, a punch threadedly mounted in the threaded opening, the block having a guide opening in communication with and extending transversely of the belt receiving opening to guide a groove cutting tool and position it relative to the belt and to the punch.

3. A machine for use in preparing belts for splicing, comprising a metal block having an opening of the proper size and shape to receive a belt, a stop movably connected with the block for limiting the movement of the belt in the opening in one direction, the block having two spaced openings communicating with the belt receiving opening, the axes of the spaced openings being substantially perpendicular to the axis of the belt receiving opening, a punch movably mounted in each spaced opening, the block having a transversely extending guide opening in communication with the belt receiving opening, for positioning a groove cutting tool with respect to the punches and the belt and for guiding the tool during operation.

4. A machine for use in preparing belts for splicing, comprising a metal block having an opening of the proper size and shape to receive a belt, a stop movably connected with the block for limiting the movement of the belt in the opening in one direction, the block having two spaced openings communicating with the belt receiving opening, the axes of the openings being substantially perpendicular to the axis of the belt receiving opening, a punch mounted in each opening, the block having a transversely extending guide opening in communication with the belt receiving opening, for positioning a groove cutting tool with respect to the punches and the belt and for guiding the tool during operation.

5. A machine for use in preparing a belt for splicing, comprising a metal block having a hole for the reception of a belt, clamping means associated with the block for forcing the belt against one wall of said opening, the block having two spaced openings in communication with the belt receiving opening, a punch movably mounted in each of the spaced openings, the block having a guide opening extending transversely of and in communication with the belt receiving opening for positioning and guiding a belt grooving tool.

6. A machine for use in preparing a belt for splicing, comprising a metal block having a hole of the size and shape to receive a belt, clamping means comprising a wedge positioned in the belt removing hole for engaging one side of the belt and means for forcefully urging it towards the other side of the opening, the block having two spaced openings communicating with the belt receiving opening, a punch movably mounted in each spaced opening, the block having also a guide opening extending transversely of the belt receiving opening and in communication with the latter, a grooved guide member positioned in the guide opening with the groove in communication with the belt receiving opening, the groove serving to receive and guide a grooving tool.

ERNEST NASSIMBENE.